United States Patent
Wang et al.

(10) Patent No.: US 7,020,795 B2
(45) Date of Patent: Mar. 28, 2006

(54) OPERATING METHOD FOR DETECTING AND SOLVING UNDERFLOW AND OVERFLOW BY USING OVERSAMPLING

(75) Inventors: Yi-Tang Wang, Hsinchu (TW); Chih-Wen Yung, Taipei Hsien (TW); Yu-Chin Chu, Chu-Pei (TW)

(73) Assignee: Faraday Technology Corp., Hsin-Chu (TW)

( * ) Notice: Subject to any disclaimer, the term of this patent is extended or adjusted under 35 U.S.C. 154(b) by 665 days.

(21) Appl. No.: 10/025,636

(22) Filed: Dec. 19, 2001

(65) Prior Publication Data
US 2003/0115498 A1    Jun. 19, 2003

(51) Int. Cl.
*G06F 11/00* (2006.01)
*G06F 1/04* (2006.01)
*H04L 7/00* (2006.01)
*H04L 1/00* (2006.01)

(52) U.S. Cl. ............... 713/600; 713/500; 340/825.2; 370/235

(58) Field of Classification Search ............ 713/600
See application file for complete search history.

(56) References Cited

U.S. PATENT DOCUMENTS

| | | | |
|---|---|---|---|
| 5,699,389 A * | 12/1997 | Beladi et al. | 375/371 |
| 6,477,181 B1 * | 11/2002 | Fujimori et al. | 370/476 |
| 6,631,429 B1 * | 10/2003 | Cota-Robles et al. | 710/52 |

FOREIGN PATENT DOCUMENTS

JP    1009125 A2 *   6/2000

* cited by examiner

*Primary Examiner*—Lynne H. Browne
*Assistant Examiner*—Stefan Stoynov
(74) *Attorney, Agent, or Firm*—Winston Hsu

(57) ABSTRACT

The present invention provides an operating method for detecting and solving the underflow and the overflow by using the oversampling. The operating method is suitable for the transmitter and the receiver that are using different clock frequencies to transmit data. In the present operating method, when the receiver receives a plurality of received packages, the leading edge sampling phase of each received package having the most frequency in the first synchronous period is used as the initial leading edge sampling phase. Afterwards, the underflow circulation center point and overflow circulation center point are determined. Then, the underflow operation and the overflow operation are processed according to the underflow circulation center point and overflow circulation center point. The extra bit is thrown away when the underflow operation is processing, and the lost bit is inserted when the overflow operation is processing.

18 Claims, 6 Drawing Sheets

OPERATING METHOD FOR DETECTING AND SOLVING UNDERFLOW AND OVERFLOW BY USING OVERSAMPLING

BACKGROUND OF THE INVENTION

1. Field of Invention

The present invention generally relates to an operating method for detecting and solving underflow and overflow. And more particularly, to an operating method for detecting and solving underflow and overflow by using oversampling.

2. Description of Related Art

When a transmitter and a receiver are using the same clock frequency to transmit and receive data, the bit number of the data received by the receiver is the same as the physical data. Thus, there is no underflow and overflow. However, when the transmitter and the receiver are using different clock frequencies to transmit and receive data, this leads to the generation of underflow and overflow. When the clock frequency of the receiver is higher than the clock frequency of the transmitter, the bit number of the data received is more than the bit number of the data transmitted by the transmitter. This phenomenon is known as underflow. When the clock frequency of the receiver is lower than the clock frequency of the transmitter, the bit number of the data received is less than the bit number of the data transmitted by the transmitter. This phenomenon is known as overflow. When the transmitter and the receiver operate in different clock frequencies, there is no adequate method for detecting and solving the underflow and the overflow problems in the prior art.

SUMMARY OF THE INVENTION

In order to solve the problems mentioned above, the present invention provides an operating method for detecting and solving underflow and overflow by using oversampling. When the clock frequency of the transmitter is different from the receiver, the present invention is able to detect and solve the underflow and the overflow problems that result from the different operation frequencies of the transmitter and the receiver.

To achieve the objective mentioned above, the present invention provides an operating method for detecting and solving underflow and overflow by using oversampling. The operating method is suitable for the transmitter and the receiver that use different clock frequencies to transmit and receive data. Wherein, the receiver receives a plurality of received packages, each received package includes a plurality of data, each data is sampled by using a plurality of sampling phases, and the sampling phase that is a first sampling for each data is referred to as the leading edge sampling phase. In the present operating method, at first, for each received package, a leading edge sampling phase with most occurrence times in a first synchronous period is used as the initial leading edge phase. Afterwards, the underflow circulation center point and overflow circulation center point are determined. Then, the underflow operation and the overflow operation are processed according to the underflow circulation center point and overflow circulation center point. The extra bit is thrown away when the underflow operation is processing, and the lost bit is inserted when the overflow operation is processing. Wherein, when these sampling phases have n (n is a positive odd number) sampling phases, the phase shift of the leading edge sampling phase that is located in between the $(n+1)/2$th sampling phase and the $([(n+1)/2]+1)$th sampling phase is used as the underflow circulation center point and overflow circulation center point. When these sampling phases have m (m is a positive even number) sampling phases, the leading edge sampling phase that is located in the $[(m/2)+1]$th sampling phase is used as the underflow circulation center point and overflow circulation center point.

The present invention further provides an operating method for detecting and solving the underflow problem by using oversampling. The operating method is suitable for a transmitter and a receiver that are using different clock frequencies to transmit and receive data. Wherein, the receiver receives a plurality of received packages, each received package includes a plurality of data, each data is sampled by using a plurality of sampling phases, and the sampling phase that is a first sampling for each data is referred to as the leading edge sampling phase. In the operating method, at first, for each received package, a leading edge sampling phase with most occurrence times in a first synchronous period is used as the initial leading edge phase. Afterwards, the underflow circulation center point is determined. Then, the underflow operation is processed according to the underflow circulation center point. When the underflow operation is processing, the extra bit is thrown away. Wherein, when these sampling phases have n (n is a positive odd number) sampling phases, the phase shift of the leading edge sampling phase that is located in between the $(n+1)/2$th sampling phase and the $([(n+1)/2]+1)$th sampling phase is used as the underflow circulation center point. When these sampling phases have m (m is a positive even number) sampling phases, the leading edge sampling phase that is located in the $[(m/2)+1]$th sampling phase is used as the underflow circulation center point.

The present invention further provides an operating method for detecting and solving the overflow problem by using oversampling. The operating method is suitable for the transmitter and the receiver that are using different clock frequencies to transmit and receive data. Wherein, the receiver receives a plurality of received packages, each received package includes a plurality of data, each data is sampled by using a plurality of sampling phases, and the sampling phase that is a first sampling for each data is referred to as the leading edge sampling phase. In the operating method, at first, for each received package, a leading edge sampling phase with most occurrence times in a first synchronous period is used as the initial leading edge phase. Afterwards, the overflow circulation center point is determined. Then, the overflow operation is processed according to the overflow circulation center point. When the overflow operation is processing, the lost bit is inserted. Wherein, when these sampling phases have n (n is a positive odd number) sampling phases, the phase shift of the leading edge sampling phase that is located in between the $(n+1)/2$th sampling phase and the $([(n+1)/2]+1)$th sampling phase is used as the overflow circulation center point. When these sampling phases have m (m is a positive even number) sampling phases, the leading edge sampling phase that is located in the $[(m/2)+1]$th sampling phase is used as the overflow circulation center point.

As all mentioned above, the present invention is capable of detecting the timing of the underflow and the overflow when the clock frequencies of the transmitter and the receiver are different. The present invention is also able to compensate properly when the underflow and the overflow happen, to ensure the bit number of the data received by the receiver is the same as the physical data. Thus, the underflow and the overflow problems are solved.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DESCRIPTION OF THE PREFERRED EMBODIMENTS

Figure 1:
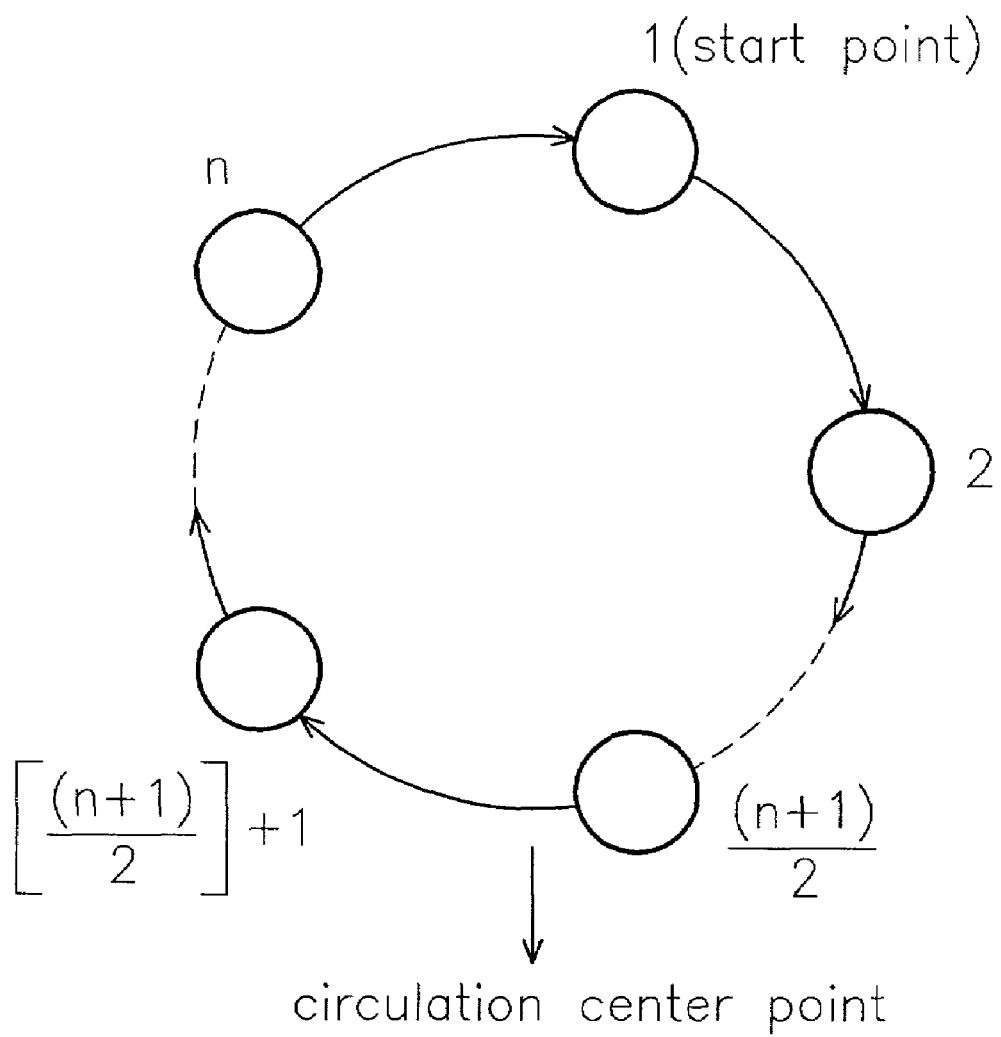
FIG. 1 is a phase shift diagram of the leading edge sampling phase of the oversampling using n (n is a positive odd number) sampling phases.
Figure 2:
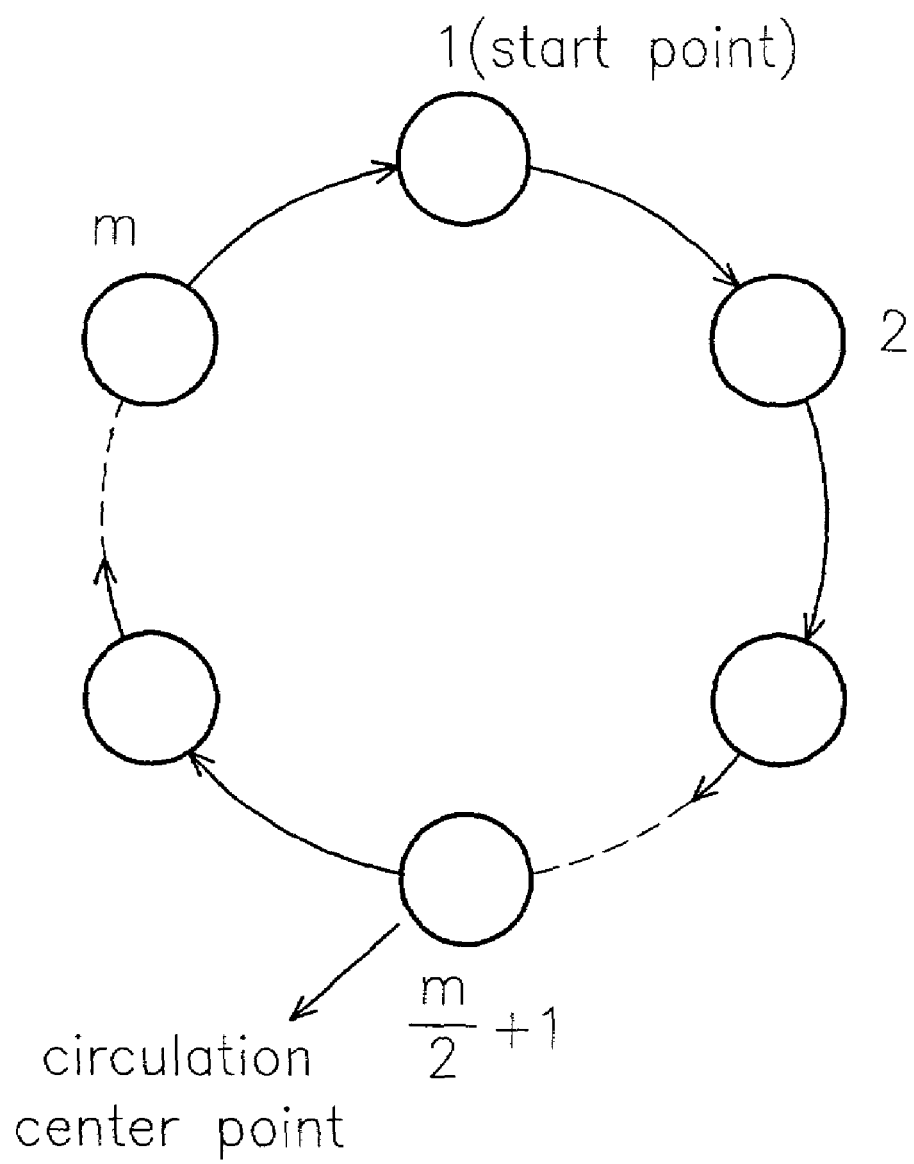
FIG. 2 is a phase shift diagram of the leading edge sampling phase of the oversampling using m (m is a positive even number) sampling phases.

Referring to FIG. 1, it schematically shows a phase shift diagram of the leading edge sampling phase of the oversampling using n (n is a positive odd number) sampling phases. As shown in FIG. 1, when the sampling phases have n (n is a positive odd number) sampling phases, the phase shift of the leading edge sampling phase that is located in between the (n+1)/2th sampling phase and the ([(n+1)/2]+1th sampling phase is referred to as the underflow circulation center point and overflow circulation center point. FIG. 2 schematically shows a phase shift diagram of the leading edge sampling phase of the oversampling using m (m is a positive even number) sampling phases. When the sampling phases have m (m is a positive even number) sampling phases, the leading edge sampling phase that is located in the [(m/2)+1]th sampling phase is referred to as the underflow circulation center point and overflow circulation center point. Before the embodiment is described, it is worth to note that even oversampling of 5 sampling phases is exemplified for easy explanation, to those who are skilled in the art, and the oversampling of several sampling phases is also adapted to the present invention, as long as the oversampling has several sampling phases.

In the present embodiment, the transmitter and the receiver are operated in different clock frequencies, and each bit of the data received by the receiver is sampled by using the oversampling structure of the 5 sampling phases. The receiver receives a plurality of received packages when the transmitter sends the data, each received package includes a plurality of data, each data is sampled by using 5 sampling phases, and the sampling phase that is a first sampling for each data is referred to as the leading edge sampling phase. Afterwards, for each received package, a leading edge sampling phase occurs most frequently in a first one synchronous period of the synchronous periods for each received package is used as the initial leading edge phase. Furthermore, when each data is sampled, a sampling phase that is sampled from the leading edge sampling phase of each data is sampled. In the present embodiment, when each data is sampled, the second sampling phase after the leading edge sampling phase that is corresponding to each data is sampled.

Then, as shown in FIG. 1, when the leading edge sampling phase shifts between phase 3 and phase 4, referred to as the circulation center point, that is, when the leading edge sampling phase shifts between phase 3 and phase 4, the phase shift between phase 3 and phase 4 is used as the underflow circulation center point and the overflow circulation center point.

Figure 3:
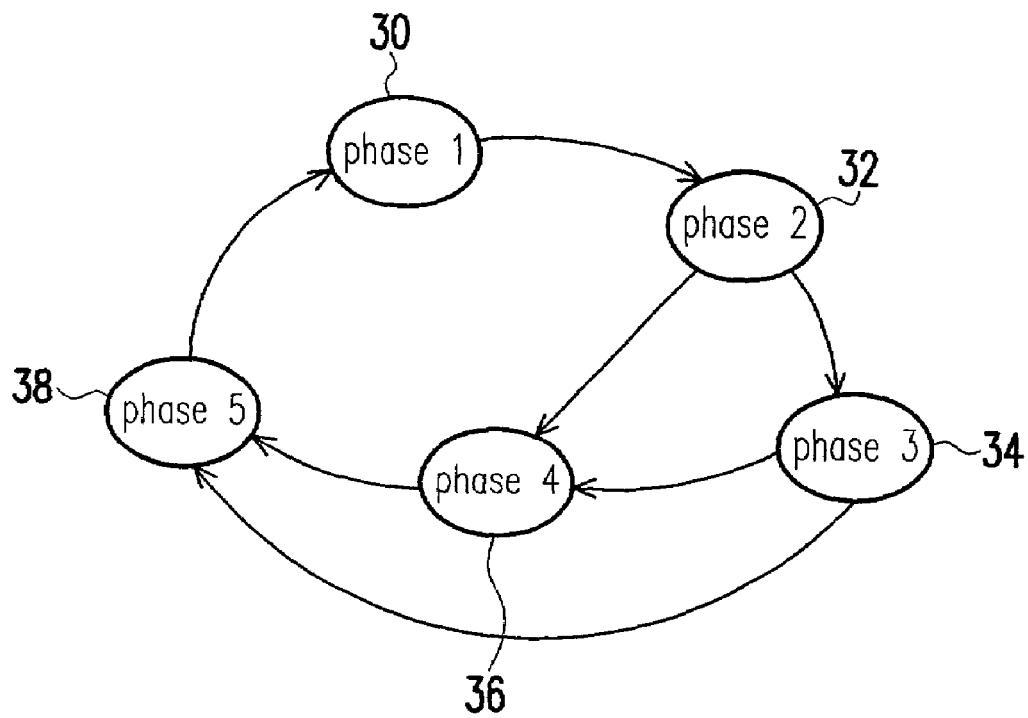
FIG. 3 is an underflowed phase shift diagram of the leading edge sampling phase of an embodiment using the operating method that is capable of detecting and solving underflow and overflow by using oversampling according to the present invention.
Figure 4:
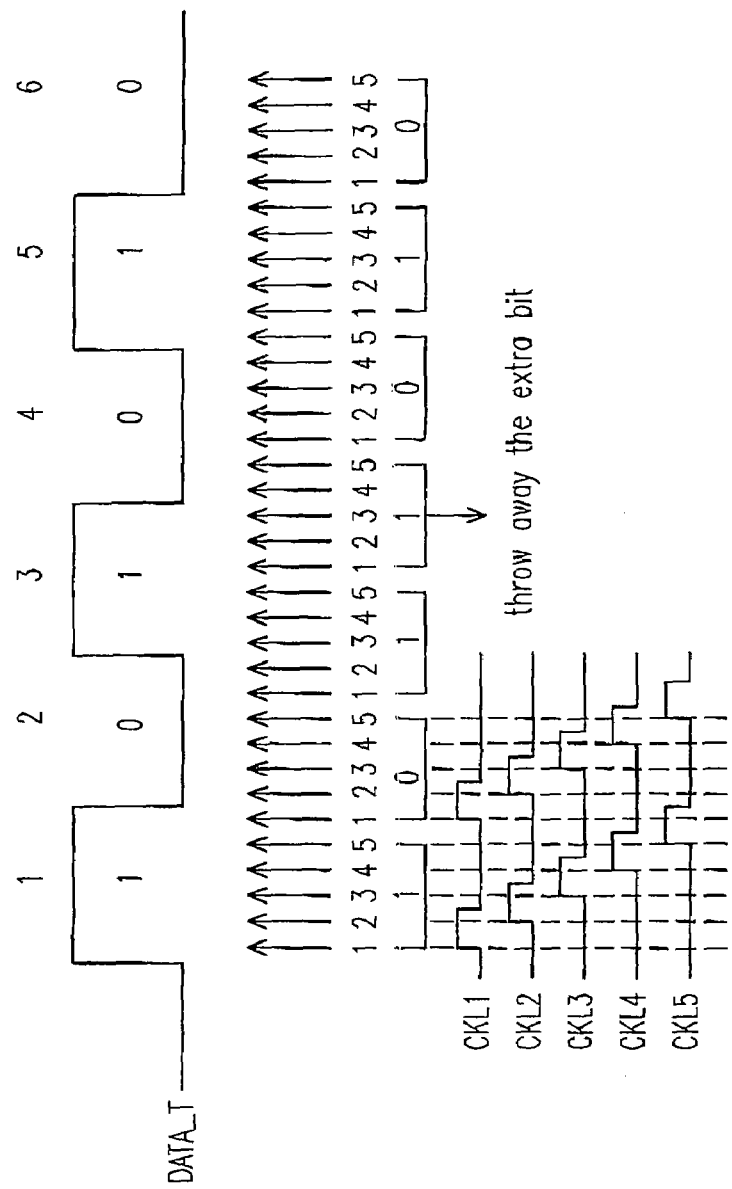
FIG. 4 is an underflowed sampling phase diagram of an embodiment using the operating method that is capable of detecting and solving underflow and overflow by using oversampling according to the present invention.

Referring to FIG. 3, it schematically shows an underflowed phase shift diagram of the leading edge sampling phase of an embodiment using the operating method that is capable of detecting and solving the underflow and the overflow by using the oversampling according to the present invention. In FIG. 3, each data received by the receiver is comprised of 5 sampling phases. These 5 sampling phases are phase 1 (30), phase 2 (32), phase 3 (34), phase 4 (36) and phase 5 (38). In the present embodiment, it is assumed that phase 1 (30) is the package initial phase. That is, phase 1 (30) is also the initial leading edge phase. Referring to FIG. 4, it schematically shows an underflowed sampling phase diagram of an embodiment using the operating method that is capable of detecting and solving underflow and overflow by using oversampling according to the present invention. Data from the transmitter is represented as signal DATA_T which comprises data bits 101010 in the embodiment. The receiver oversamples the signal DATA_T by using five clock signals CLK1, CLK2, CLK3, CLK4 and CLK5. As shown in FIG. 4, rising edges of CLK1, CLK2, CLK3, CLK4 and CLK5 triggers the sampling phases 1, 2, 3, 4 and 5, respectively. Further, as described above, the sampling phase that is a first sampling for each data is referred to as the leading edge sampling phase. Accordingly, the leading edge sampling phase of data bit 1 is phase 1, the leading edge sampling phase of data bit 2 is phase 2, the leading edge sampling phase of data bit 3 is phase 3, the leading edge sampling phase of data bit 4 is phase 4, and the leading edge sampling phase of data bit 5 is phase 5. As shown in FIG. 4, since the clock frequency of the receiver is higher than the clock frequency of the transmitter, the phase shift of the leading edge phase is shifted according to the sequence of phase 1 (30) to phase 2 (32), phase 3 (34), phase 4 (36), phase 5 (38), phase 1 (30). In FIG. 4, when the leading edge phase shifts from phase 3 (34) to phase 4 (36), since the bit number of the data received is more than 1 compared to the physical data, this leads to the underflow circumstance being generated, therefore a need exists for throwing away one extra bit, and this is referred to as the underflow operation. In the physical hardware circuit, an underflow signal may be enabled at this time, which subsequently throws away one extra bit, so that the bit number of the data received by the receiver is the same as the physical data.

In addition, if the data received by the receiver includes a big noise or the clock frequency of the receiver is much higher than the clock frequency of the transmitter, the leading edge phase shifts 2 phases one time rather than the original 1 phase shift. Referring the FIG. 3 again, when the leading edge phase shifts from phase 2 (32) to phase 4 (36), or shifts from phase 3 (34) to phase 5 (38), it also results in the bit number of the received data being more than one bit compared to the physical data, and this leads to the underflow circumstance being generated, therefore a need exists for throwing away one extra bit, and this is referred to as the underflow operation. In the physical hardware circuit, an underflow signal may be enabled at this time, which subsequently throws away one extra bit, so that the bit number of the data received by the receiver is the same as the physical data. As described above, the present invention is able to detect the timing of the underflow and solve the underflow problem.

Figure 5:
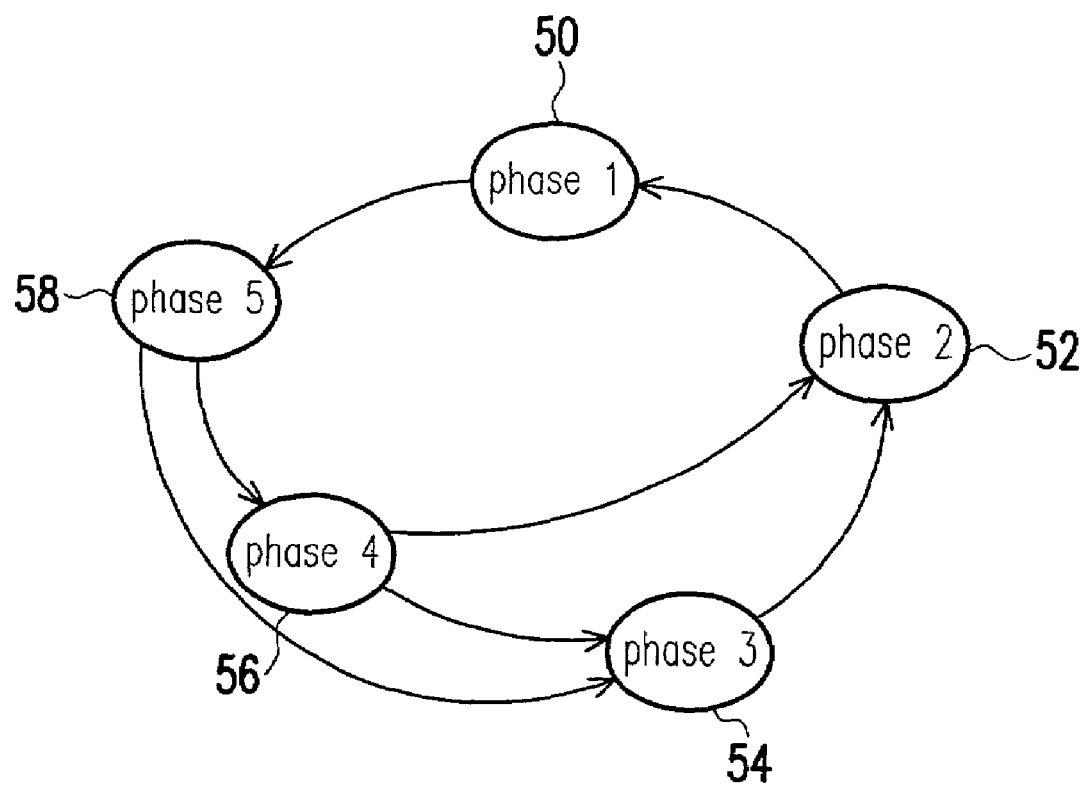
FIG. 5 is an overflowed phase shift diagram of the leading edge sampling phase of an embodiment using the operating method that is capable of detecting and solving underflow and overflow by using oversampling according to the present invention.
Figure 6:
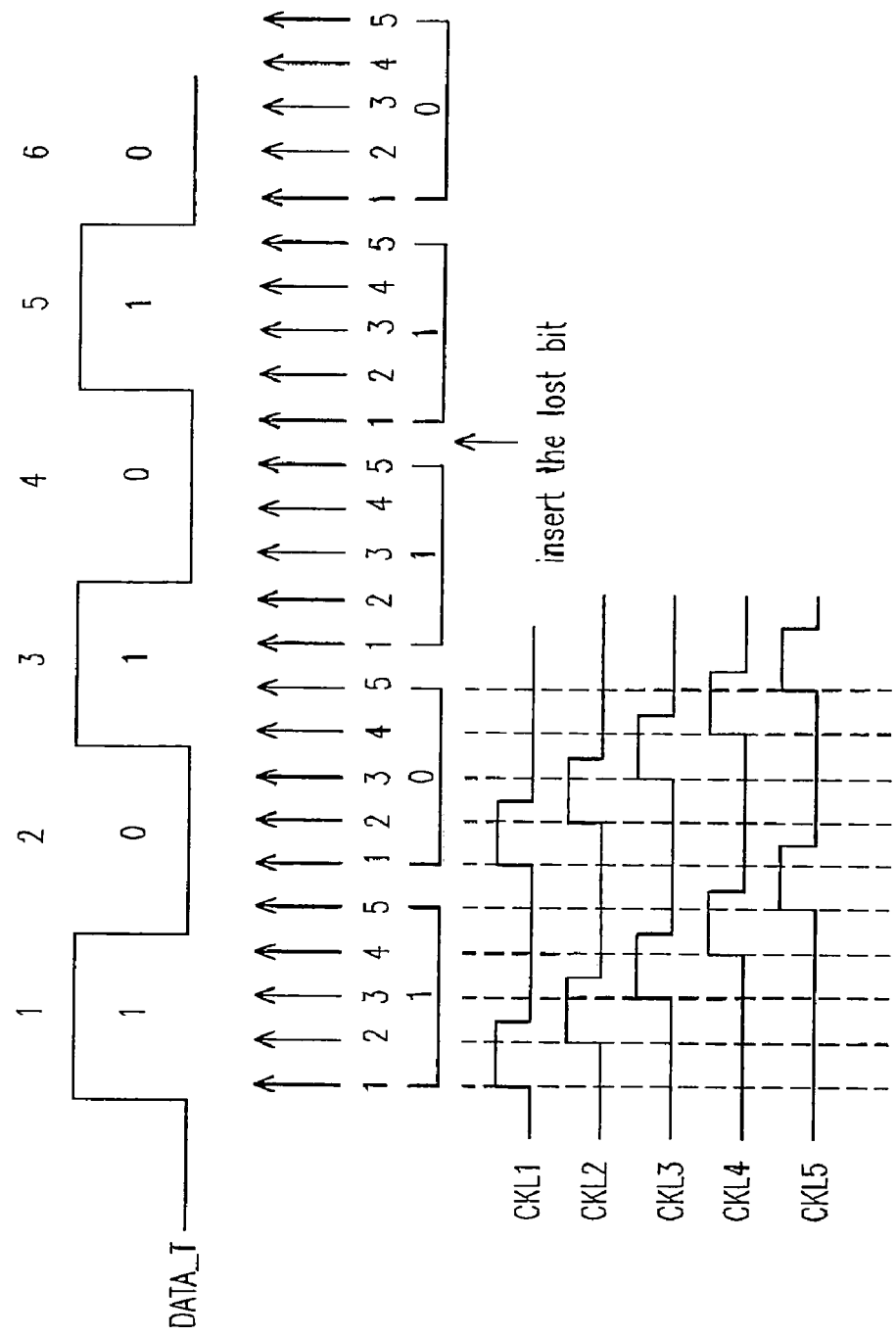
FIG. 6 is an overflowed sampling phase diagram of an embodiment using the operating method that is capable of detecting and solving underflow and overflow by using oversampling according to the present invention.

Referring to FIG. 5, it schematically shows an overflowed phase shift diagram of the leading edge sampling phase of an embodiment using the operating method that is capable of detecting and solving underflow and overflow by using oversampling according to the present invention. In FIG. 5, the data received by the receiver is comprised of 5 sampling phases. These 5 sampling phases are phase 1 (50), phase 2 (52), phase 3 (54), phase 4 (56) and phase 5 (58). In the present embodiment, it is assumed that the phase 1 (50) is the package initial phase. That is, phase 1 (50) is also the initial leading edge phase. Referring to FIG. 6, it schematically shows an overflowed sampling phase diagram of an embodiment using the operating method that is capable of detecting and solving the underflow and the overflow by using the oversampling according to the present invention. Similarly, data from the transmitter is represented as signal DATA_T which comprises data bits 101010 in the embodiment, and the receiver oversamples the signal DATA_T by using five clock signals CLK1, CLK2, CLK3, CLK4 and CLK5. Further, rising edges of CLK1, CLK2, CLK3, CLK4 and CLK5 triggers the sampling phases 1, 2, 3, 4 and 5, respectively. As shown in FIG. 6, since the clock frequency of the receiver is lower than the clock frequency of the transmitter, the phase shift of the leading edge phase is shifted according to the sequence of the phase 1 (50), phase 5 (58), phase 4 (56), phase 3 (54), phase 2 (52), phase 1 (50). In FIG. 6, when the leading edge phase shifts from phase 4 (56) to phase 3 (54), since the bit number of the data received is less than 1 compared to the physical data, this leads to the overflow circumstance being generated, therefore a need exists for inserting one extra bit, and this is referred to as the overflow operation. In the physical hardware circuit, an overflow signal may be enabled at this time, which subsequently inserts one extra bit, so that the bit number of the data received by the receiver is the same as the physical data.

In addition, if the data received by the receiver includes a big noise or the clock frequency of the receiver is much lower than the clock frequency of the transmitter, the leading edge phase shifts 2 phases one time rather than the original 1 phase shift. Referring the FIG. 5 again, when the leading edge phase shifts from phase 4 (56) to phase 2 (52), or shifts from phase 5 (58) to phase 3 (54), it also results in the bit number of the received data being less than one bit compared to the physical data, this leads to the overflow circumstance being generated, therefore a need exists for inserting one extra bit, and this is referred to as the overflow operation. In the physical hardware circuit, an overflow signal may be enabled at this time, which subsequently inserts one extra bit, so that the bit number of the data received by the receiver is the same as the physical data. As described above, the present invention is able to detect the timing of the overflow and solve the overflow problem.

As described above, the present invention includes the following advantages:

1. When the clock frequency of the transmitter is different from the receiver, the present invention is able to detect the timing of the underflow and the overflow.

2. When the underflow or the overflow happens, the present invention is able to compensate properly, so that the bit number of the data received by the receiver is the same as the physical data. Thus, the underflow and the overflow problems can be solved.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. An operating method, for detecting and solving underflow and overflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times in a first one of at least one synchronous period being used as an initial leading edge phase;

determining an underflow circulation center point and an overflow circulation center point;

processing an underflow operation and an overflow operation according to the underflow circulation center point and the overflow circulation center point;

throwing away an extra bit when processing the underflow operation; and inserting a lost bit when processing the overflow operation, wherein, whether to process the underflow operation is determined by relative positions between the underflow circulation center point and the leading edge sampling phases, wherein, whether to process the overflow operation is determined by relative positions between the overflow circulation center point and the leading edge sampling phases.

2. The operating method of claim 1, wherein when each of the data is sampled, the data is sampled by using one of the sampling phases after the leading edge sampling phase that is corresponding to each of the data.

3. An operating method, for detecting and solving underflow and overflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times in a first one of at least one synchronous period being used as an initial leading edge phase;

determining an underflow circulation center point and an overflow circulation center point;

processing an underflow operation and an overflow operation according to the underflow circulation center point and the overflow circulation center point;

throwing away an extra bit when processing the underflow operation; and inserting a lost bit when processing the overflow operation, wherein when the sampling phases have n (n is a positive odd number) sampling phases, the phase shift of the leading edge sampling phase that is located in between the (n+1)/2th sampling phase and the ([(n+1)/2]+1th sampling phase is used as the underflow circulation center point and the overflow circulation center point.

4. An operating method, for detecting and solving underflow and overflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times in a first one of at least one synchronous period being used as an initial leading edge phase;

determining an underflow circulation center point and an overflow circulation center point;

processing an underflow operation and an overflow operation according to the underflow circulation center point and the overflow circulation center point;

throwing away an extra bit when processing the underflow operation; and inserting a lost bit when processing the overflow operation, wherein when the sampling phases have m (m is a positive even number) sampling phases, the leading edge sampling phase that is located in the [(m/2)+1]th sampling phase is used as the underflow circulation center point and the overflow circulation center point.

5. An operating method, for detecting and solving underflow and overflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times in a first one of at least one synchronous period being used as an initial leading edge phase;

determining an underflow circulation center point and an overflow circulation center point;

processing an underflow operation and an overflow operation;

throwing away an extra bit when processing the underflow operation; and inserting a lost bit when processing the overflow operation;

wherein when the sampling phases have n (n is a positive odd number) sampling phases, the phase shift of the leading edge sampling phase that is located in between the (n+1)/2th sampling phase and the ([(n+1)/2]+1th sampling phase is used as the underflow circulation center point and the overflow circulation center point, when the sampling phases have m (m is a positive even number) sampling phases, the leading edge sampling phase that is located in the [(m/2)+1]th sampling phase is used as the underflow circulation center point and the overflow circulation center point.

6. The operating method of claim 5, wherein when each of the data is sampled, the data is sampled by using one of the sampling phases after the leading edge sampling phase that is corresponding to each of the data.

7. An operating method, for detecting and solving underflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times is used as an initial leading edge phase;

determining an underflow circulation center point;

processing an underflow operation according to the underflow circulation center point; and throwing away an extra bit when processing the underflow operation, wherein, whether to process the underflow operation is determined by relative positions between the underflow circulation center point and the leading edge sampling phases.

8. The operating method of claim 7, wherein when each of the data is sampled, the data is sampled by using one of the sampling phases after the leading edge sampling phase that is corresponding to each of the data.

9. An operating method, for detecting and solving underflow by using oversampling, the method is suitable for a transmitter and a receiver to transmit and receive data by using different clock frequencies the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times is used as an initial leading edge phase;

determining an underflow circulation center point;

processing an underflow operation according to the underflow circulation center point; and throwing away an extra bit when processing the underflow operation, wherein when the sampling phases have n (n is a positive odd number) sampling phases, the phase shift of the leading edge sampling phase that is located in between the (n+1)/2th sampling phase and the ([(n+1)/2]+1th sampling phase is used as the underflow circulation center point.

10. An operating method, for detecting and solving underflow by using oversampling the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times is used as an initial leading edge phase;

determining an underflow circulation center point;

processing an underflow operation according to the underflow circulation center point; and throwing away an extra bit when processing the underflow operation, wherein when these sampling phases have m (m is a positive even number) sampling phases, the leading edge sampling phase that is located in the [(m/2)+1]th sampling phase is used as the underflow circulation center point.

11. An operating method, for detecting and solving underflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times is used as an initial leading edge phase;

determining an underflow circulation center point;

processing an underflow operation according to the underflow circulation center point; and throwing away an extra bit when processing the underflow operation;

wherein when the sampling phases have n (n is a positive odd number) sampling phases, the phase shift of the leading edge sampling phase that is located in between the (n+1)/2th sampling phase and the ([(n+1)/2]+1 th sampling phase is used as the underflow circulation center point, when the sampling phases have m (m is a positive even number) sampling phases, the leading edge sampling phase that is located in the [(m/2)+1]th sampling phase is used as the underflow circulation center point.

12. The operating method of claim 11, wherein when each of the data is sampled, the data is sampled by using one of the sampling phases after the leading edge sampling phase that is corresponding to each of the data.

13. An operating method, for detecting and solving underflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times is used as an initial leading edge phase;

determining an overflow circulation center point;

processing an overflow operation according to the overflow circulation center point; and inserting a lost bit when processing the overflow operation, wherein, whether to process the overflow operation is determined by relative positions between the overflow circulation center point and the leading edge sampling phases.

14. The operating method of claim 13, wherein when each of the data is sampled, the data is sampled by using one of the sampling phases after the leading edge sampling phase that is corresponding to each of the data.

15. An operating method, for detecting and solving overflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times is used as an initial leading edge phase;

determining an overflow circulation center point;

processing an overflow operation according to the overflow circulation center point; and inserting a lost bit when processing the overflow operation, wherein when the sampling phases have n (n is a positive odd number) sampling phases, the phase shift of the leading edge sampling phase that is located in between the (n+1)/2th sampling phase and the ([(n+1)/2]+1th sampling phase is used as the overflow circulation center point.

16. An operating method, for detecting and solving overflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times is used as an initial leading edge phase;

determining an overflow circulation center point:

processing an overflow operation according to the overflow circulation center point; and inserting a lost bit when processing the overflow operation, wherein when the sampling phases have m (m is a positive even number) sampling phases, the leading edge sampling phase that is located in the [(m/2)+1]th sampling phase is used as the overflow circulation center point.

17. An operating method, for detecting and solving overflow by using oversampling, the method is suitable for a transmitter and a receiver to transmit and receive data by using different clock frequencies, the receiver receives a plurality of received packages, each of the received packages includes a plurality of data, each of the data is sampled by a plurality of sampling phases, the sampling phase that is a first sampling for each of the data is referred to as a leading edge sampling phase, the method comprises the steps of:

for each of the received packages, the leading edge sampling phase with most occurrence times is used as an initial leading edge phase;

determining an overflow circulation center point;

processing an overflow operation according to the overflow circulation center point; and inserting a lost bit when processing the overflow operation;

wherein when the sampling phases have n (n is a positive odd number) sampling phases, the phase shift of the leading edge sampling phase that is located in between the (n+1)/2th sampling phase and the ([(n+1)/2]+1th sampling phase is used as the overflow circulation center point, when these sampling phases have m (m is a positive even number) sampling phases, the leading edge sampling phase that is located in the [(m/2)+1]th sampling phase is used as the overflow circulation center point.

18. The operating method of claim 17, wherein when each of the data is sampled, the data is sampled by using one of the sampling phases after the leading edge sampling phase that is corresponding to each of the data.

\* \* \* \* \*